United States Patent [19]
Reid

[11] Patent Number: 5,483,168
[45] Date of Patent: Jan. 9, 1996

[54] OPTICAL POTENTIAL FIELD MAPPING SYSTEM

[75] Inventor: Max B. Reid, San Francisco, Calif.

[73] Assignee: The United States of America as represented by the Administrator of the National Aeronautics and Space Administration, Washington, D.C.

[21] Appl. No.: 24,133

[22] Filed: Mar. 1, 1993

[51] Int. Cl.⁶ .................................................. G02B 27/64
[52] U.S. Cl. ........................ 324/525; 359/292; 382/195; 382/206; 395/93; 395/94
[58] Field of Search .............................. 364/424.02, 525, 364/444; 382/28, 19, 23, 48; 359/72, 292, 298; 395/93, 94

[56] References Cited

U.S. PATENT DOCUMENTS

| | | | |
|---|---|---|---|
| 4,958,914 | 9/1990 | Owechko et al. | 359/72 |
| 5,020,114 | 5/1991 | Fujioka et al. | 382/28 |
| 5,208,750 | 5/1993 | Kurami et al. | 364/424.02 |
| 5,241,481 | 8/1993 | Olsén | 364/424.02 |

OTHER PUBLICATIONS

Latombe, Jean–Claude, "Chapter 7—Potential Field Methods," Robot Motion Planning, Kluwer Academic Publishers, Mass. (no month) (1991) pp. 295–341.

Primary Examiner—Emanuel T. Voeltz
Assistant Examiner—Thomas Peeso
Attorney, Agent, or Firm—Kenneth L. Warsh

[57] ABSTRACT

The present invention relates to an optical system for creating a potential field map of a bounded two dimensional region containing a goal location and an arbitrary number of obstacles. The potential field mapping system has an imaging device and a processor. Two image writing modes are used by the imaging device, electron deposition and electron depletion. Patterns written in electron deposition mode appear black and expand. Patterns written in electron depletion mode are sharp and appear white. The generated image represents a robot's workspace. The imaging device under processor control then writes a goal location in the workspace using the electron deposition mode. The black image of the goal expands in the workspace. The processor stores the generated images, and uses them to generate a feedback pattern. The feedback pattern is written in the workspace by the imaging device in the electron deposition mode to enhance the expansion of the original goal pattern. After the feedback pattern is written, an obstacle pattern is written by the imaging device in the electron depletion mode to represent the obstacles in the robot's workspace. The processor compares a stored image to a previously stored image to determine a change therebetween. When no change occurs, the processor averages the stored images to produce the potential field map.

12 Claims, 5 Drawing Sheets

OPTICAL POTENTIAL FIELD MAPPING SYSTEM

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION a. Technical Field or Field of the Invention

The present invention relates to an optical system capable of creating a potential field map of a bounded two dimensional region containing a goal location and arbitrary number of obstacles. The potential field map of the region can be used by an autonomous mobile robot to guide itself from any initial location to a goal location while avoiding obstacles which may be present in the robot's workspace.

b. Description of the Prior Art

Figure 1A:
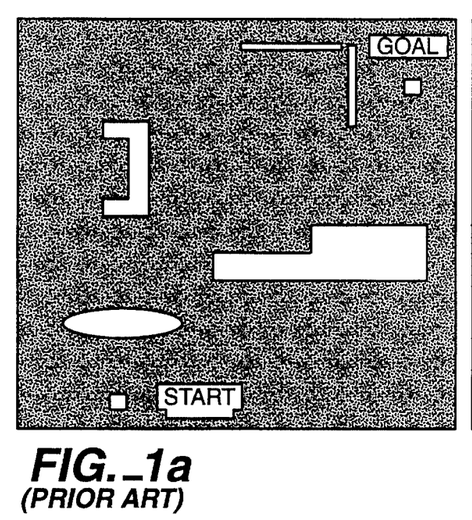
FIGS. 1(a)–1(d) are plan views illustrating prior art potential field mapping methods.

There are many types of robot systems which include such devices as wheeled vehicles, manipulator arms, multi-fingered hands, and free flying platforms. The robot workspace may be partially filled with obstacles, and regions which it cannot traverse due to physical or other constraints. For a robot to move without running into the obstacles, it is necessary to determine a robot path from an initial location to a designated goal location within the bounded two dimension workspace. FIG. 1(a) shows a plan view of such a workspace. This plan view could represent a room bounded by walls and containing furniture of various shapes, or a region of outdoor terrain with the obstacles representing trees, buildings, or areas of ground which are too steep for the robot to traverse. However, the workspace is not limited to these two examples.

Many types of path planning systems have been investigated, see Chapter 7, "Potential Field Methods," of Jean-Claude Latombe's *Robot Motion Planning*, Kluwer Academic Publishers, Massachusetts (1991). Generally, there are two basic types of robot path planning systems: (1) those methods which attempt to find an optimal path, for instance, a minimal distance path; and (2) those which attempt to find an efficient path.

In the potential field method, the robot is treated as a charged object, the goal is an oppositely charged region, and obstacles are regions having the same polarity charge as the robot. Each location in the robot workspace is treated as having a potential energy U(x). In practice, the workspace is usually divided into some finite number of cells. Each cell is assigned a potential value and the robot moves from cell to cell. The robot, because it is treated as being charged, follows the potential gradient responding to a force $F(x)=-\nabla U(x)$. The conventional potential field methods, therefore, require that a potential value be calculated for each cell. Generally, the field throughout the workspace due to each obstacle and the goal are calculated separately and then added to produce a potential field map for the entire workspace.

Figure 1B:
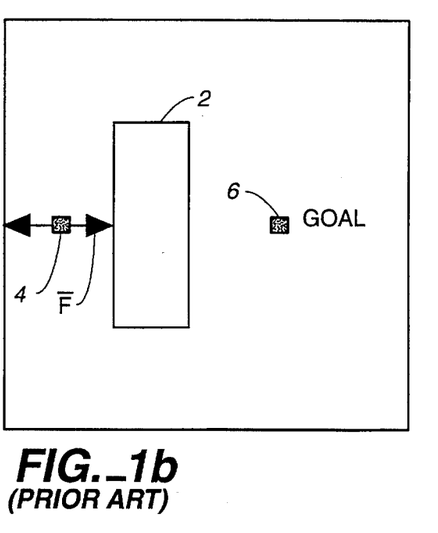

A significant problem with the conventional potential field approach is that it often produces local potential minima. Because the robot path follows the potential gradient, local minima in the potential field map can cause the robot path to include traps which prevent the robot from reaching a goal 6. FIG. 1(b) schematically illustrates this problem for a workspace containing a single simple obstacle 2. At a point directly behind the obstacle 2 from the goal 6, the force on the robot 4 is either directly away from or towards the obstacle, or the robot 4 may reach a local minimum where the forces exactly cancel.

Figure 1C:
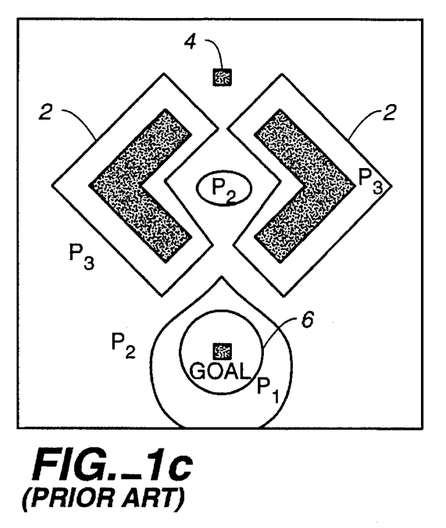
Figure 1D:
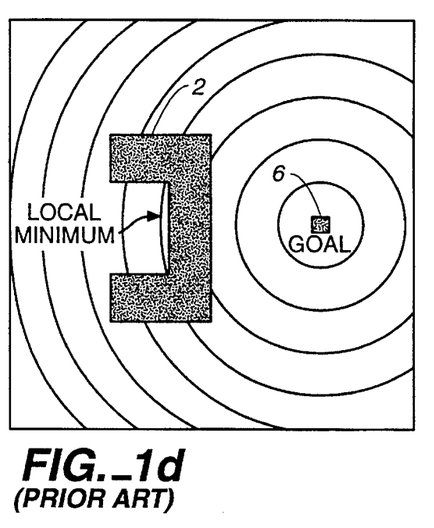

Another problem arises in conventional methods which contribute positive potential fields. FIG. 1(c) shows three levels of equipotential lines, with values $P_3>P_2>P_1$, for a robot workspace containing two obstacles 2. Those edges of the obstacles 2 which are close together form a high potential ridge (at potential value $P_3$). This high potential ridge forms a local minimum at potential $P_2$. This kind of local minima can be eliminated by using a spatially extending potential only for the goal 6. With this approach, the obstacles are still located at maximum potential locations, but they have no field which extends beyond their boundaries. This solution causes its own problems with local minima, as shown in FIG. 1(d). As the potential monotonically decreases the closer the robot gets to the goal 6, the robot will proceed straight for the goal until it hits an obstacle. The robot then slides along the obstacles until it either slides around the obstacle's edge or is trapped at a local minimum.

Figure 2A:
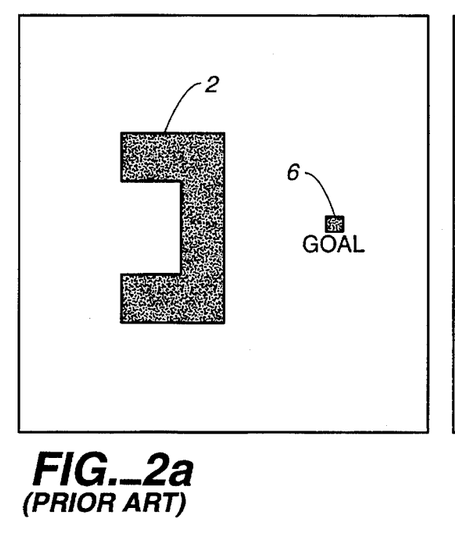
FIGS. 2(a)–2(d) are plan views illustrating the creation of a potential field map with no local minimum according to a prior art method.
Figure 2B:
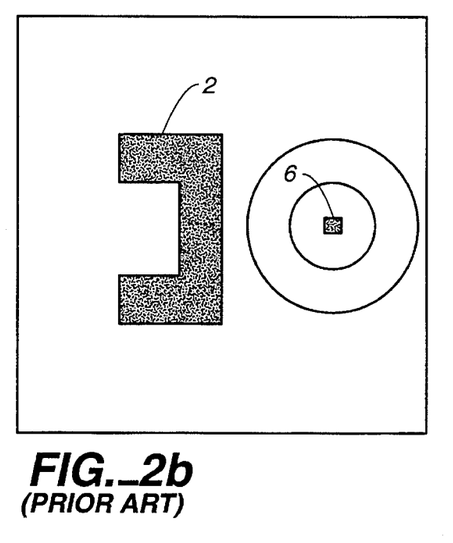
Figure 2C:
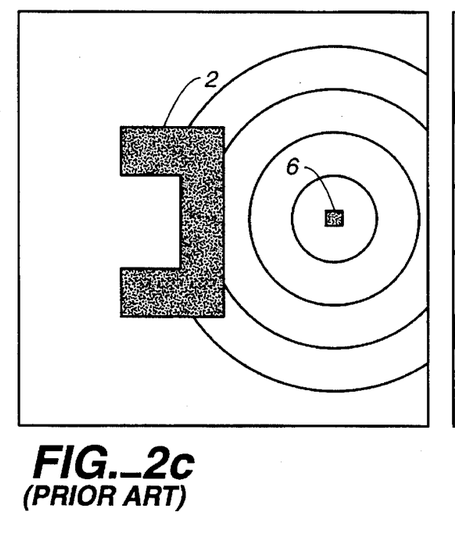
Figure 2D:
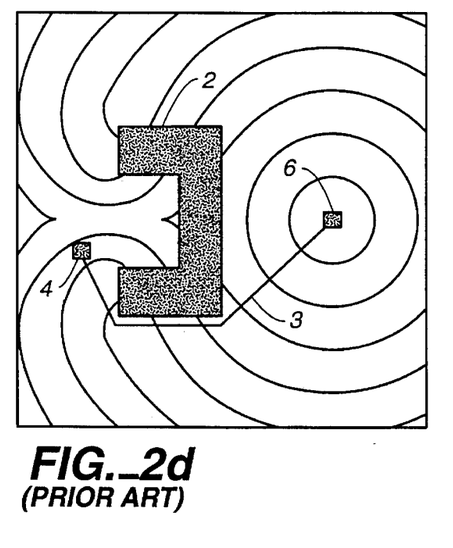

One method that avoids all the local minima situations shown in FIGS. 1(b)–1(d) is schematically illustrated in FIGS. 2(a)–2(d). A simple one obstacle robot workspace is shown in FIG. 2(a). The obstacles are considered maximum potential regions which do not exert forces beyond their boundaries. The goal location is the source of an expanding low potential region which starts in a small area and grows uniformly until it reaches an obstacle. Upon reaching an obstacle, the goal's "field" spreads around the obstacle. The field stops expanding when it has filled the entire workspace. In FIG. 2(b) the first two equipotential lines surrounding the goal 6 are shown. When the equipotential lines reach obstacle 2, the obstacle's charge distorts the equipotential lines as shown in FIG. 2(c). The completed pattern in FIG. 2(d) contains no local minima. A robot 4 located behind the obstacle 2 is guided around it, following a path 3 such as that shown in FIG. 2(d). In a conventional digital electronic implementation, this system runs in $O(N^{3/2})$ time, where N is the number of cells. Alternative techniques for overcoming local minima are even more computationally intensive. Therefore, digital implementation of this mapping system has proven laborious, particularly in a robot workspace where the obstacles are moving.

SUMMARY OF THE INVENTION

An object of the present invention is to provide a method and apparatus for rapidly producing a potential field map having no local minima. Further objects of the present invention include providing an optical potential field mapping system and method therefor which allows analog creation of a potential field map, eliminates the need for time consuming digital computations, and rapidly produces a potential field map at speeds higher than comparable computer generation methods.

To achieve the above objects and more, the present invention provides an optical potential field mapping system and a method therefor. The optical field mapping system includes imaging means for generating images of at least one of an obstacle pattern, a goal pattern and a feedback pattern; and, processing means for processing at least two of the images to determine a potential field map.

In one embodiment, the imaging means includes a spatial light modulating means, and the processing means includes a control means. The control means generates a write command signal and a video command signal. The write command signal indicates the writing mode for the spatial light modulating means, either electron deposition writing or electron depletion writing. The video command signal supplies either an obstacle pattern, a goal pattern, or a feedback pattern to the spatial light modulating means.

In another embodiment, the imaging means includes a converting means and a spatial light modulating means. The converting means includes a beam splitting means, obstacle pattern means and modulating means. The beam splitting means splits the main beam into a first and second beam. The obstacle pattern means modulates the first beam to generate an obstacle writing beam. The modulating means modulates the second beam to generate a goal/feedback writing beam. The spatial light modulating means generates an obstacle pattern in the image by electron depletion writing based on the obstacle writing beam, and generates at least one of the goal pattern and feedback pattern in the image by electron deposition writing based on the goal/feedback writing beam. The processing means includes a means for controlling the modulating means to generate the goal/feedback writing beam based on at least one of the images.

The method of generating a potential field map in a system including at least one spatial light modulator includes the steps of initializing a workspace of the spatial light modulator; writing a goal location in the workspace according to the images displayed by the spatial light modulator; comparing at least two recorded images to determine a change therebetween; creating a potential map from the recorded images based on the results of the comparing step; writing a feedback pattern in the workspace; and, writing an obstacle pattern in the workspace. When the results of the comparing step indicate substantially no change between the two recorded images, the potential field map is created and the process ends. However, when the results of the comparing step do indicate a change, the feedback pattern and obstacle pattern are written in the workspace.

Other objects, features, and characteristics of the present invention; methods, operations, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

DESCRIPTION OF THE PREFERRED EMBODIMENTS

Figure 3:
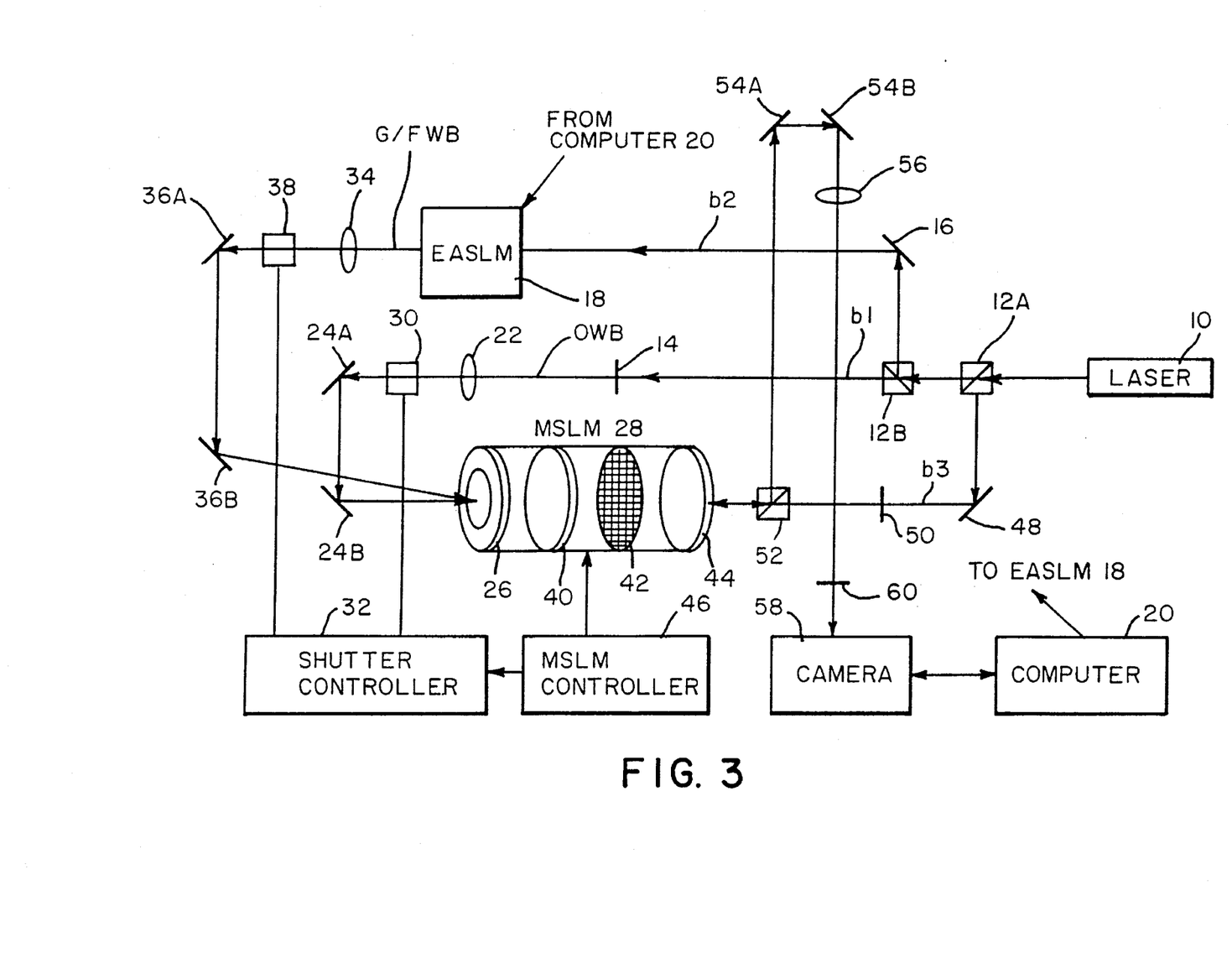
FIG. 3 is a schematic diagram of a potential field mapping system according to an embodiment of the present invention.

In FIG. 3, a laser beam emitted from laser 10 is split into three beams b1, b2, and b3 by two beam splitters 12A and 12B. The first beam b1 illuminates an obstacle pattern modulator 14 which modulates the first beam to carry a black and white image of an obstacle pattern. The modulated first beam OWB is referred to as an obstacle writing beam.

A mirror 16 directs second beam b2 to illuminate an electronically addressed spatial light modulator (EASLM) 18. A computer 20 writes a pattern onto the EASLM 18. The pattern is either a goal or feedback pattern which EASLM 18 uses to modulate the second beam b2 to carry an image of the goal or feedback pattern. The modulated second beam G/FWB is referred to as a goal/feedback writing beam.

A lens 22 focuses the obstacle writing beam OWB, and mirrors 24A and 24B direct the obstacle writing beam OWB onto the surface of a photocathode 26 of a microchannel plate spatial light modulator (MSLM) 28. A shutter 30, controlled by shutter controller 32, may block the obstacle writing beam OWB. A lens 34 focuses the goal/feedback writing beam G/FWB, and mirrors 36A and 36B direct the goal/feedback beam G/FWB onto the surface of photocathode 26. A shutter 38, controlled by shutter controller 32, may block the goal/feedback writing beam G/FWB.

The MSLM 28 includes a photocathode 26, which emits electrons in the same spatial pattern as light incident thereon. The electrons are multiplied by microchannel plate 40, accelerated by mesh electrode 42, and deposited on the back surface of a thin electro-optic crystal 44. The electro-optic crystal 44 can comprise, for example, $LiNbO_3$. An MSLM controller 46 maintains the crystal voltage of the electro-optic crystal 44 at one of two levels. If MSLM controller 46 sets a high crystal voltage, the charge deposited on the electro-optic crystal accumulates. This is called electron deposition writing. If MSLM controller 46 sets a low crystal voltage, a net charge will be depleted from the crystal surface. This is called electron depletion writing. The net charge on the backsurface of the electro-optic crystal 44 causes an electric field to exist between the front surface and the back surface of the electro-optic crystal 44. This field in turn induces proportional changes in the refractive index of the electro-optic crystal 44.

In one embodiment, of the present invention, an operator controls the operation of MSLM controller 46 manually. The operator uses manual controls (not shown) of the MSLM Controller 46 to instruct the MSLM controller as to proper operation of MSLM 28 and shutter controller 32. However, in a preferred embodiment, MSLM controller 46 is controlled by computer 20 to further automate the system. When MSLM controller 46 triggers the shutter controller 32 to open shutter 30 and sets a low crystal voltage, the MSLM 28 performs electron depletion writing using the obstacle writing beam OWB. When MSLM controller 46 triggers the shutter controller 32 to open shutter 38 and sets a high crystal voltage, the MSLM 28 performs electron deposition writing using the goal/feedback writing beam G/FWB.

A mirror 48 directs a third laser beam b3 incident on electro-optic crystal 44 via polarizer 50 and beam splitter 52. The third beam b3 is reflected off of a backplane (not shown) of electro-optical crystal 44. The backplane can be a dielectric mirror, typically either $SiO_2$ or an $SiO_2/ZrO_2$ multilayer. The polarization of third beam b3 is rotated according to the change in the refractive index of the electro-optic crystal 44. Beam splitter 52, and mirrors 54A and 54B, direct the third beam b3 incident on lens 56. The lens 56 focuses third beam b3 onto the CCD array (not shown) of a camera 58 via a polarizer 60. The polarizer 60 transmits the third beam b3 to the camera 58 at the same polarization angle as the third beam b3 before its reflection off the electro-optic crystal 44. The image received by the camera 58 from the third beam b3 is dark in those areas where charge was deposited during electron deposition writing, i.e., the goal and feedback pattern. These areas are called charge deposition areas. The image received by the camera 58 from the third beam b3 is bright in those areas where charge was depleted during electron depletion writing, i.e., the obstacle pattern. These areas are called charge depletion areas.

One important difference between electron deposition writing and electron depletion writing is that patterns written using electron deposition writing expand beyond the boundaries of the image incident on the photocathode 26. However, patterns written using electron depletion writing have sharp edges and remain confined to the boundaries of the image incident on the photocathode 26. This phenomenon occurs as a result of secondary electron generation on the surface of electro-optic crystal 44 caused by primary electrons emitted from microchannel plate 40.

Figure 4:
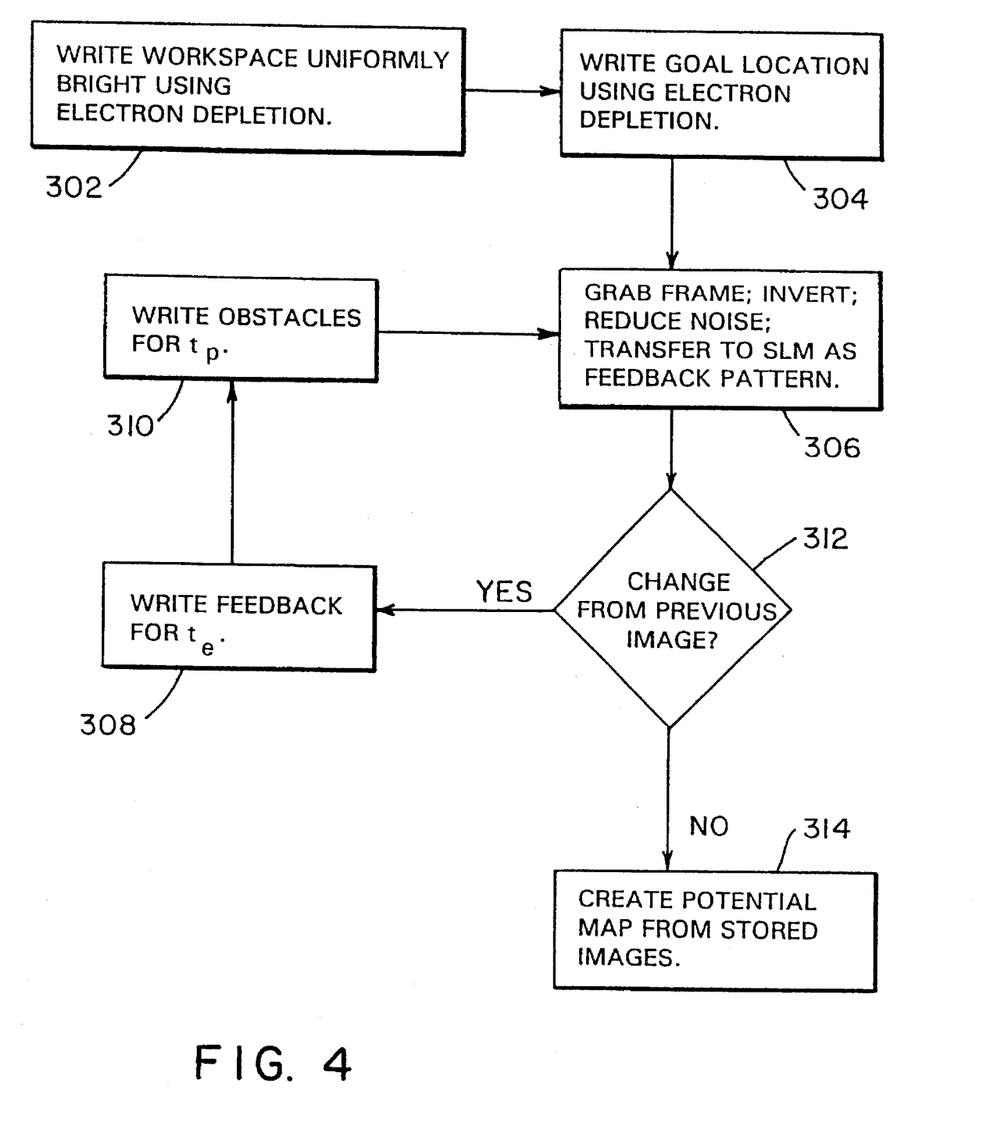
FIG. 4 is a flow diagram of the method of operation of a potential field mapping system according to the present invention; and, FIG. 5 is a schematic diagram of a potential field mapping system according to another embodiment of the present invention.

FIG. 4 is a flow diagram of a method of using an optical potential field mapping system, such as shown in FIG. 3. The use of the two writing modes to produce potential field maps in the system of FIG. 3 is outlined in FIG. 4. A surface of electro-optic crystal 44, referred to as a map, is initially written as a uniformly bright pattern by uniformly depleting charge from the electro-optic crystal 44, step 302. There are a variety of ways for performing initialization step 302. The obstacle pattern modulator 14 can modulate first beam b1 using an obstacle pattern having no obstacles. Then MSLM controller 46 controls shutter 30 and MSLM 28 to perform electron depletion writing using the obstacle writing beam OWB. Alternatively, computer 20 writes a patternless goal/feedback pattern on EASLM 18. Then MSLM controller 46 controls shutter 38 and MSLM 28 to perform electron depletion writing using the goal/feedback writing beam G/FWB. A further alternative is to use a separate light source, such as a light emitting diode or incandescent light source. Directing light emitted from the separate light source incident on photocathode 26 can initialize electro-optic crystal 44.

A small area in the map at the location of the robot's goal is then written as a dark pattern, step 304. The computer 20 controls EASLM 18 to modulate the second beam b2 to carry the goal pattern. Then, MSLM controller 46 controls MSLM 28 and shutter controller 32 as described above, to perform electron deposition writing using the goal/feedback writing beam G/FWB. Thus the goal pattern is written by electron deposition onto electro-optic crystal 44.

Next, in step 306, computer 20 converts the image received by camera 58 to a gray scale image and stores the gray scale image in memory. This is called frame grabbing. The computer 20 then inverts the stored gray scale image. Next, computer 20 reduces noise in the inverted image for transfer to EASLM 18 as a feedback pattern. The inverted image is comprised of pixels. The individual pixels of the inverted image can take on values between 0 and 1, with 0 designated as white and 1 designated as black or visa versa. All pixels with a value of 0.5 or less are stored as 0, and all pixels with a value greater than 0.5 are stored as 1. The EASLM 18 can only modulate the second beam to carry black and white images, thus the need for reducing noise in the inverted image. Under control of computer 20, the EASLM 18 modulates second beam b2 in accordance with the feedback pattern transferred from computer 20 to produce the goal/feedback beam.

In step 312, the stored image is compared with a previously stored image. If the number of pixel differences between the stored image and the previously stored image is less than or equal to the number of pixel differences which can be attributed to noise in the system, the system functions as there being no change in the images. The number of pixel differences attributed to noise in the system is a system implementation quantity that is dependent on the type/quality of components used in the system.

When the number of pixel differences is greater than the number of pixel differences which can be attributed to noise, steps 308 and 310 are performed. In step 308, MSLM controller 46 controls MSLM 28 and shutter controller 32 as described above to perform electron deposition writing using the goal/feedback writing beam G/FWB. Thus, the feedback pattern carried by the goal/feedback writing beam G/FWB is written on electro-optic crystal 44. The electron deposition writing is performed for a period of time, $t_e$. During time $t_e$, dark areas written on electro-optic crystal 44 corresponding to the feedback pattern expand since they are written using electron deposition writing. The deposited charge spreads into depleted charge areas, which may include deposited areas representing obstacles in a robot's workspace. Time $t_e$ is a system implementation quantity that is dependent on the type/quality of components used in the system. In an ideal embodiment of the present invention, time $t_e$, would be infinitely small. However, in a preferred embodiment $t_e$ is made as small as permissible by system implementation constraints. Time $t_e$ must be kept at a duration less than that required for the deposited charge to completely spread through the depleted charge areas.

Then in step 310, the obstacle pattern carried by the obstacle writing beam OWB is written on electro-optic crystal 44. The MSLM controller 46 controls MSLM 28 and shutter controller 32 as described above to perform electron depletion writing using the obstacle writing beam OWB. Thus, the obstacle pattern carried by obstacle writing beam OWB is written on electro-optic crystal 44. The electron depletion writing is performed for a period of time, $t_p$. During time $t_p$, the deposited charge which spreads into any depleted charge areas representing obstacles during step 308 is removed. Deposited charge which is not representative of obstacles during step 308 is not removed. Time $t_p$ is determined based on time $t_e$ using the following equation:

$$t_p = t_e \frac{1}{(\delta_s - 1)}$$

where $\delta_s$ the secondary electron emission coefficient. System operation then returns to step 306.

If in step 312, computer 20 determines substantially no change between the stored image and the previously stored image, the potential field map is created, step 314. Computer 20 averages the stored images to produce the potential field map. Since the first stored image is the goal location, the last stored image only shows the obstacle areas as bright, and the remaining recorded images vary between the two extremes, the average of the recorded images results in a potential field map. Furthermore, since the charge can not spread discontinuously from the goal location, no local minima are created. A robot placed at any location in the workspace represented by the potential field map follows the gradient of the potential to the goal location without being trapped behind obstacles.

The obstacle pattern modulator 14 can be a transparency (such as for an overhead projector), or any other type of spatial light modulator. In one embodiment, the obstacle pattern modulator is an EASLM. In this one embodiment, the generated obstacle pattern is under the control of computer 20. Generation of obstacle patterns is then similar to generation of goal and feedback patterns in the embodiment of FIG. 3. The obstacle pattern can be quickly and easily changed using computer 20, as opposed to the difficulty and time required to switch transparencies. This allows for real time update of obstacle patterns, as required for robot workspaces with moving obstacles. Additionally, the MSLM 28 can be replaced by any spatial light modulator which has both a spatially fixed writing mode and a spatially expanding writing mode.

In another embodiment of the present invention, the EASLM18 is an electronically addressed magneto-optic spatial light modulator (MOSLM) which displays a 128×128 pixel binary pattern having a 9.1 mm aperture. Alternatively, any conventional liquid crystal television can be used. In other embodiments, the camera 58 is a Cohu Model 6500 CCD camera, the computer 20 a MASSCOMP 5600 computer, the MSLM controller a Technology Advancement Group (TAG) Model M3 MSLM controller, and the MSLM28 a Model X1699 from Hamamatsu Photonics Corporation.

In a further alternative embodiment, the embodiment of FIG. 3 can be modified to perform direct feedback. Instead of generating and modulating the second beam b2 using EASLM 18, the images carried by the third beam b3 are made incident upon the photocathode 26 of MSLM 28. Further, alternatives include performing noise reduction using a second MSLM or Hughes liquid crystal light value instead of through digital computation by computer 20.

The optical system is fully parallel and a plurality of such systems can be linked to meet robot workspace size and potential field mapping time constraints.

The method of operating an optical potential field mapping system according to the present invention is also subject to several variations. The following are examples of such variations and should in no way be read as the only variations possible. Step 306 can be limited to frame grabbing. The inverting, noise reduction and transfer steps of step 306 can then be performed prior to step 308. In step 312, it is not necessary that the stored images be compared. Instead the inverted images or the inverted images which have undergone noise reduction can be compared. In step 316, it is not necessary that the stored images be averaged. Instead, the inverted images can be stored and averaged to produce a potential field map, or the inverted images which have undergone noise reduction can be stored and averaged to produce a potential field map.

Figure 5:
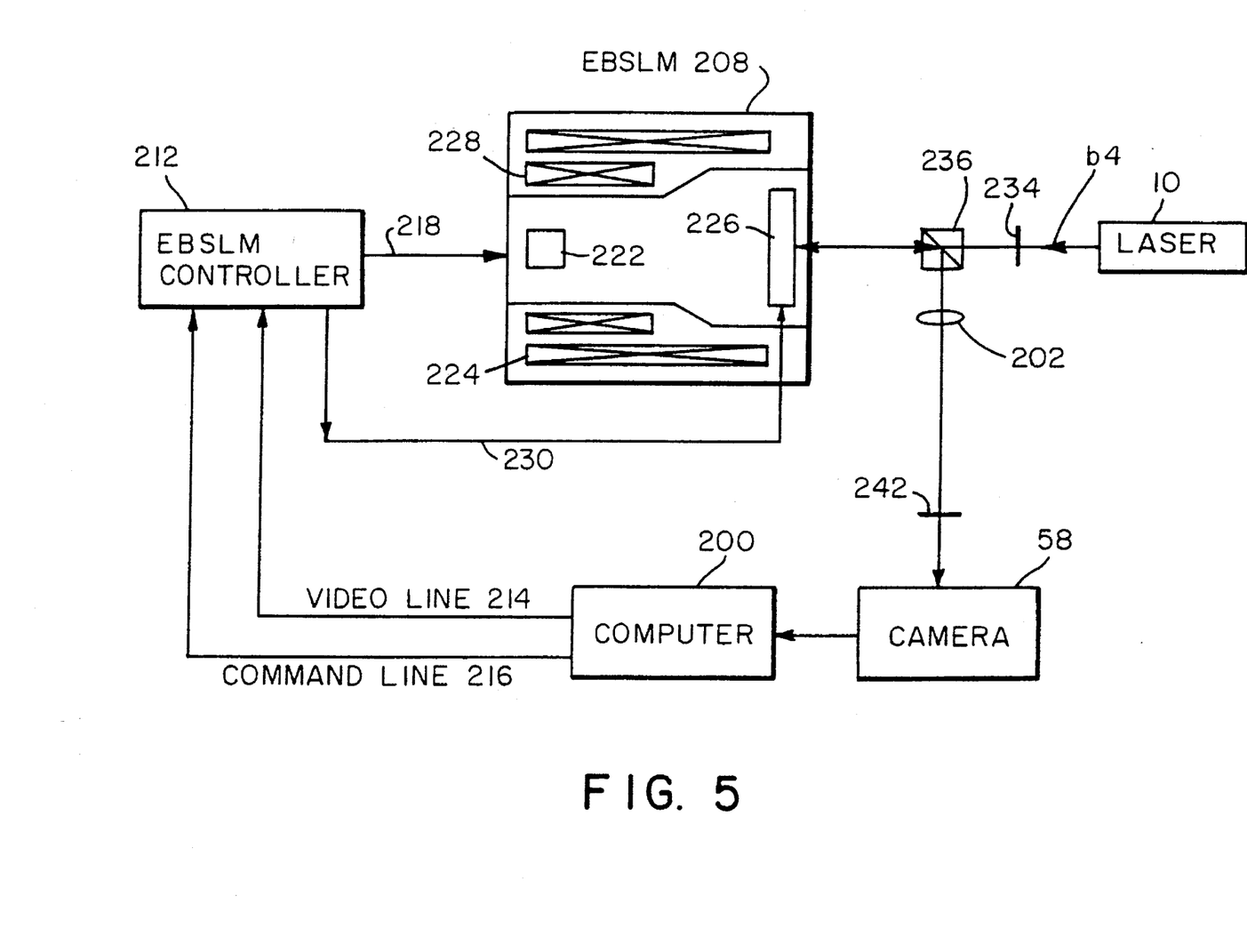

FIG. 5 shows another embodiment of a potential field mapping system according to the present invention. The embodiment in FIG. 5 utilizes an electron beam addressed spatial light modulator EBSLM which greatly simplifies the system of the present invention as compared with the embodiment of FIG. 3. As shown in FIG. 5, a computer 200, such as an IBM 386 PC, transfers stored images to an EBSLM controller 212, such as Hamamatsu model C3637 over a video line 214. The stored images can be a goal pattern, a feedback pattern, or an obstacle pattern. The computer 200 also sends commands to the EBSLM controller 212 over command line 216. The commands sent over command line 216 instruct EBSLM controller 212 as to the writing mode and duration. As in the embodiment of FIG. 3, electron deposition writing is used when the image to be written is a goal pattern or feedback pattern, and electron depletion writing is used when the image to be written is an obstacle pattern.

The EBSLM controller 212 sends to EBSLM 208 a first control signal 218 representing the image sent over video line 214 and a second control signal 230 representing the writing command sent over line 216. Electron gun 222 of EBSLM208 converts electric signal 218 into an electron beam. The electron beam is focused by focusing coil 224 and simultaneously scanned across electro-optic crystal 226 by deflection coil 228. The electro-optic crystal 226 can comprise, for example, $LiNbO_3$. The second control signal 230 biases the electro-optic crystal 226 of EBSLM 208 to place the EBSLM in either electron deposition writing mode or electron depletion writing mode. If EBSLM controller 212 biases the electro-optic crystal 226 with a high voltage, charge deposited will accumulate on the surface of the electro-optic crystal. This is called electron deposition writing. If EBSLM controller 212 biases the electro-optic crystal 226 with a low voltage, net charge will be depleted from the surface of the electro-optic crystal. This is called electron depletion writing. The net charge on the backsurface of the electro-optic crystal 226 causes an electric field to exist between the front surface and back surface of the electro-optic crystal 226. This field in turn induces proportional changes in the refractive index of the electro-optic crystal 226.

Laser 10 emits a beam b4. Polarizer 234 polarizes beam b4. After passing through a beam splitter 236 beam b4 is incident on the electro-optic crystal 226. The laser beam b4 is reflected off of a backplane (not shown) of electro-optical crystal 226, and the polarization of laser beam b4 is rotated according to the change in the refractive index of the electro-optic crystal 226. In an embodiment of the present invention, the backplane is a dielectric mirror typically comprising, for example, $SiO_2$ or an $SiO_2/ZrO_2$ multilayer.

The reflected laser beam b4 is directed by beam splitter 236, focused by lens 202, and incident onto the CCD array (not shown) of a camera 58 via a polarizer 242. The polarizer 242 transmits the laser beam b4 to the Camera 58 at the same polarization angle as the laser beam b4 before its reflection off the electro-optic crystal 226. The image received by the camera 58 from the laser beam b4 is dark in those areas where charge was deposited during electron deposition writing, i.e., the goal and feedback pattern. These areas are called charge deposition areas. The image received by the camera 58 from the laser beam b4 is bright in those areas where charge was depleted during electron depletion writing, i.e, the obstacle pattern. These areas are called charge depletion areas.

There is one important difference between electron deposition writing and electron depletion writing. Patterns written using electron deposition writing expand beyond the boundaries of the image scanned on electro-optical crystal 226. Patterns written using electron depletion writing have sharp edges and remain confined to the boundaries of the image scanned on electro-optic crystal 226. This phenomenon occurs as a result of secondary electron generation on the surface of electro-optic crystal 226 caused by primary electrons emitted from electron gun 222.

The use of the two writing modes to produce potential field maps using the system of FIG. 5 is also outlined in FIG. 4. A surface of electro-optic crystal 226, referred to as a map, is initially written as a uniformly bright pattern by depleting charge uniformly on the electro-optic crystal 226, step 302. Computer 200 supplies a blank image stored in memory over video line 214 and an electron depletion writing command over command line 216. EBSLM controller 212 then issues the corresponding first control signal 218 and second control signal 230. Thus, EBSLM 208 write a uniformly bright pattern on electro-optic crystal 226.

A small area in the map at the location of the robot's goal is then written as a dark pattern, step 304. Computer 200 supplies an image of the goal pattern stored in memory over video line 214 and an electron deposition writing command over command line 216. EBSLM controller 212 then issues the corresponding first control signal 218 and second control signal 230. The EBSLM 208 then writes the goal pattern on electro-optic crystal 226.

Next, in step 306, computer 200 converts the image received by camera 58 to a gray scale image and stores the gray scale image in memory. This is called frame grabbing. The computer 200 then inverts the stored image. Next, computer 200 reduces noise in the inverted image. The inverted image is comprised of pixels. The individual pixels can take on values between 0 and 1, with 0 designated as white and 1 designated as black, or visa versa. The computer 200 then designates all pixels with a value of 0.5 or less as 0, and all pixels with a value greater than 0.5 as 1. Noise reduction eliminates the production of spurious regions and improves the speed with which the potential field map is created. Spurious regions are regions of the electro-optical crystal 226 which should appear white, but appear dark because noise in the feedback pattern has caused deposition writing of these regions. The computer 200 then transfers the inverted image which has undergone noise reduction to EBSLM controller 212 over video line 214 as a feedback pattern.

In step 312, the stored image is compared with a previously stored image. If the number of pixel differences between the stored image and the previously stored image is less than or equal to the number of pixel differences which can be attributed to noise in the system, the system functions as there being no change between the images. The number of pixel differences attributed to noise in the system is a system implementation quantity that is dependent on the type/quality of components used in the system.

When the number of pixel differences is greater than the number of pixel differences which can be attributed to noise, steps 308 and 310 are performed. In step 308, computer 200 sends an electron deposition writing command to EBSLM controller 212 over command line 216.

EBSLM controller then sends the corresponding first control signal 218 and second control signal 230 to EBSLM208. EBSLM 208 then writes the feedback pattern sent over video line 214 in step 306 on electro-optic crystal 226 by electron deposition. The electron deposition writing command sent over command line 216 includes a duration $t_e$ for performing the electron deposition writing. Thus, electron deposition writing is performed for a period of time, $t_e$. During time $t_e$, dark areas written on electro-optic crystal 226 corresponding to the feedback pattern expand since they are written using electron deposition writing. The deposited charge spreads into depleted charge areas, which may include areas representing obstacles in a robot's workspace. Time $t_e$ is a system implementation quantity that is dependent on the type/quality of components used in the system. In an ideal embodiment of the present invention, time $t_e$, would be infinitely small. However, in a preferred embodiment, $t_e$ is made as small as permissible by system implementation constraints. Time $t_e$ must be kept at a duration less than that required for the deposited charge to completely spread through the depleted charge areas.

Then in step 310, computer 200 supplies an obstacle pattern stored in memory to EBSLM controller 212 over video line 214. The computer 200 also supplies an electron depletion command to EBSLM controller 212 over command line 216. EBSLM controller 212 issues the corresponding first and second controls signals 218 and 230 to EBSLM 208. EBSLM 208 then writes the obstacle pattern sent over video line 214 on electro-optic crystal 226 using electron depletion. The writing command sent over command line 216 includes a duration $t_p$ for performing the electron depletion writing. Thus, the electron depletion writing is performed for a period of time, $t_p$. During time $t_p$, the deposited charge which spreads into any depleted charge areas representing obstacles during step 308 is removed. Deposited charge which is not representative of obstacles during step 308 is not removed. Time $t_p$ is determined based on time $t_e$ using the following equation:

$$t_p = t_e \frac{1}{(\delta_s - 1)}$$

where $\delta_s$ is the secondary electron emission coefficient. System operation then returns to step 306.

If in step 312, computer 200 determines substantially no change between the stored image and the previously stored image, the potential field map is created in step 316. The computer 200 then averages the stored images to produce the potential field map. Since the first stored image is the goal location, the last stored image only shows the obstacle areas as bright, and the remaining stored images vary between the two extremes, the average of the stored images results in a potential field map. Furthermore, since the charge can not spread discontinuously from the goal location, no local minima are created. A robot placed at any location in the workspace represented by the potential field map follows the gradient of the potential to the goal location without being trapped behind obstacles. Furthermore, noise reduction need not be performed through digital computation with computer 200, but can be performed using a second MSLM or a Hugh liquid crystal light valve.

The optical system is fully parallel and a plurality of such systems can be linked to meet robot workspace size and potential field mapping construction time constraints.

Again, the method of operating an optical potential field mapping system according to the present invention is subject to the same variations when applied to the embodiment of FIG. 5 as was discussed after the FIG. 3 embodiment. Furthermore, but less preferable, noise reduction can be performed only for those pixels of the stored image which should appear white. For example, if a pixel value of 0 designates black in the inverted image, then all pixels in the inverted image with a value of 0.5 or less are designated as 0. This leaves all pixels in the inverted image having a value greater than 0.5 unchanged. Deposition writing is performed for those pixels in the inverted image having a value greater than 0.5. The degree of deposition writing depends on the value of the pixels in the inverted image which have undergone noise reduction. Pixels having a smaller pixel value are not written as dark as pixels of a higher value; therefore, the dark pattern on electro-optic crystal 226 will not expand as quickly as when noise reduction designates all pixels in the inverted image as either 1 or 0. Thus, the potential field map is not created as quickly.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

I claim:

1. An optical potential field mapping system for producing a potential field map of a physical region, said system comprising:

imaging means for generating images of the physical region, said imaging means including a spatial light modulating means for modulating the images based on a video command signal and a write command signal;

processing means for processing at least two of the images to produce the potential field map of the physical region, said processing means including a recording means for storing the images, and a first control means for generating the write command signal and the video command signal for use by the imaging means, the video command signal including at least one of an obstacle pattern signal, a goal pattern signal, and a feedback pattern signal;

said first control means including inverting means for generating inverted images using the stored images; threshold means for removing noise from the inverted images to generate a feedback pattern; comparison means for comparing at least two stored images to determine a change therebetween, mapping means for creating a potential field map based on output from the comparison means; feedback writing means for generating a feedback pattern signal based on the feedback pattern; obstacle writing means for generating an obstacle pattern signal; goal writing means for generating a goal pattern signal;

said mapping means including averaging means for averaging at least two of the stored images to create the potential field map;

said processing means including second control means for outputting to the spatial light modulating means a first control signal and a second control signal;

said spatial light modulating means including means for forming, in response to the first control signal, an image corresponding to the video of an electron depletion writing mode and electron deposition writing mode based on the writing command signal;

beam emitting means for emitting a main beam;

said imaging means including converting means for producing a goal/feedback writing beam and an obstacle writing beam based on the main beam, and spatial light modulating means for generating the images using at least one of the obstacle writing beam and the goal/feedback writing beam;

said converting means including beam splitting means for splitting the main beam into at least a first beam and a second beam, obstacle pattern means for modulating the first beam to generate the obstacle wring beam, modulating means for modulating the second beam to generate the goal/feedback writing beam; and the spatial light modulating means including means for electron depletion writing an obstacle pattern in the image based on the obstacle writing beam, and for electron deposition writing at least one of the goal pattern and feedback pattern in the image based on the goal/feedback writing beam.

2. The system of claim 1, wherein the imaging means further comprises:

first shutter means, disposed in an optical path of the goal/feedback writing beam, for blocking the goal/feedback writing beam from passing to the spatial light modulating means;

second shutter means, disposed in an optical path of the obstacle writing beam, for blocking the obstacle writing beam from passing to the spatial light modulator when; and controller means for controlling the spatial light modulating means to perform one of electron depletion and deposition writing, and for controlling the first shutter means and the second shutter means.

3. The system of claim 1, wherein the beam splitting means includes means for splitting the main beam into a third beam;

the processing means includes recording means for storing the images based on the third beam; and the spatial light modulating means includes directing means for directing the third beam incident on the recording means.

4. The system of claim 1, wherein the processing means includes feedback writing means for controlling the modulating means to generate the goal/feedback writing beam based on at least one of the images.

5. The system of claim 1, wherein the processing means includes:

recording means for storing the images;

inverting means for generating an inverted image using corresponding ones of the stored images;

threshold means for removing noise from the inverted images to generate a feedback pattern;

comparison means for comparing at least two stored images to determine a change therebetween;

mapping means for creating a potential field map based on output from the comparison means; and feedback writing means for controlling the modulating means to generate the goal/feedback writing beam based on the feedback pattern.

6. The system of claim 5, wherein the mapping means includes averaging means for averaging at least two of the recorded images to create the potential field map.

7. A method of generating a potential field map in a system including at least one spatial light modulator and a workspace, the method comprising the steps of:

(a) initializing the workspace;

(b) writing a goal location in the workspace;

(c) storing the displayed images;

(d) comparing at least two stored images to determine a change therebetween;

(e) creating a potential map from the stored images based on results of step (d);

(f) writing a feedback pattern in the workspace based on step (c); and (g) writing an obstacle pattern in the workspace.

8. The method of claim 7, wherein the steps (b) and (f) use electron deposition writing, and the steps (a) and (g) use electron depletion writing.

9. The method of claim 7, wherein step (c) includes the steps of:

(i) storing an image displayed by the spatial light modulator;
(ii) generating an inverted image based on the stored image;
(iii) reducing noise in the inverted image; and
(iv) generating the feedback pattern from the results of step (c)(iii).

10. The method of claim 9, wherein step (e) includes the step of averaging at least two of the stored images to create the potential field map.

11. The method of claim 7, wherein step (e) is performed when the results of the comparing step indicate substantially no change between the at least two recorded images, and steps (f) and (g) are performed when the results of the comparing step indicate a change between the at least two recorded images.

12. The method of claim 7, wherein step (e) includes the step of averaging at least two of the stored images to create the potential field map.

* * * * *